May 30, 1933.   H. N. WYLIE   1,911,866
RUBBER BEARING BUSH
Filed March 3, 1931

Inventor:
Hamilton Neil Wylie,
By Mawhinney & Mawhinney,
Attys.

Patented May 30, 1933

1,911,866

UNITED STATES PATENT OFFICE

HAMILTON NEIL WYLIE, OF TWICKENHAM, ENGLAND

RUBBER BEARING BUSH

Application filed March 3, 1931, Serial No. 519,857, and in Great Britain April 7, 1930.

This invention relates to bush bearings, of the kind wherein a deformable rubber sleeve is united with a liner of harder material, the bush being mounted in such a way that small relative angular movements of the bearing members merely cause the rubber to deform, whereas in the event of excessive movement the hard liner slips on the coacting bearing member and prevents overstressing of the rubber. An example of such a bush is shown in the specification of my prior British Patent No. 286330.

The chief object of the present invention is to provide a simple construction of bush which can be very easily fitted in its bearing.

According to this invention, the bush is mounted on a bearing member which is oversize in respect of the bush and of the housing containing it, so that the bush is engaged thereby under relatively considerable radial pressure.

Preferably the oversize member consists of a sleeve or distance piece secured to the bearing mounting and forming the inner member or pivot pin of the bearing.

In the accompanying drawing:—

Figure 4 shows one form of oversize sleeve in process of insertion into the rubber bush; while

Like numerals indicate like parts throughout the drawing.

In all the constructions illustrated, the bush embodies a tube 2 of a non-metallic distortable material which has a high coefficient of friction, such as woven fabric or cotton impregnated to have the necessary stiffness and frictional qualities. This constitutes the hard liner and is adapted to engage the inner member of the bearing under relatively considerable radial pressure, as described later. To this liner is cemented or vulcanized the deformable rubber sleeve 3, and the sleeve and liner so united constitute the complete bush.

In the application of such a bush to the hanger bearings of a vehicle suspension spring, the bush is inserted (being a push fit) in the spring eye 4 or other housing, which is preferably slightly longer than the deformable rubber portion of the bush so that there is no possibility of the deformable rubber portion projecting beyond the eye at either end. The inner bearing member or pivot pin is then inserted, this part, in accordance with the invention, being slightly larger in diameter than the bore of the liner 2. The liner is thus stretched radially and therefore the complete bush is subjected to material radial compression at all times. Furthermore, the liner is caused firmly to grip the inner bearing member and this, aided by the fact that it is made of material having a high coefficient of friction, prevents any slipping between the liner and the inner bearing member during small angular movements when the rubber portion merely deforms in the well-known manner. In the event of a large angular movement occurring before the rubber sleeve becomes so highly stressed as to be in danger of disintegration or damage, the liner will slip on the inner bearing member. The liner 2 is to all intents and purposes inextensible when the bush is fitted in position, and the rubber sleeve 3 is thus restrained from spreading longitudinally under pressure.

Figure 1:
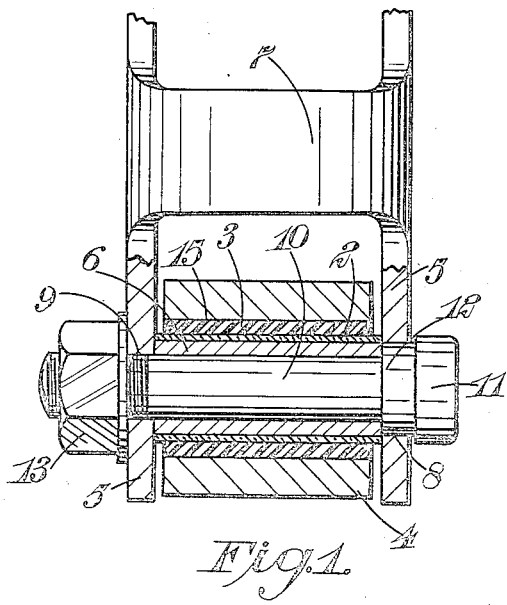
Figure 1 is an axial section of a bush bearing according to the invention and shows its application to a hanger of a vehicle suspension spring.
Figure 4:
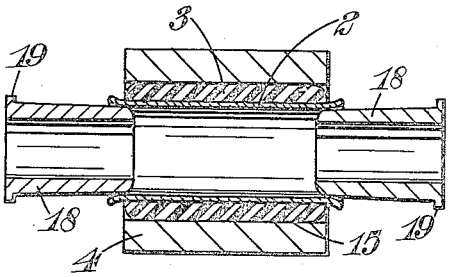
Figure 2:
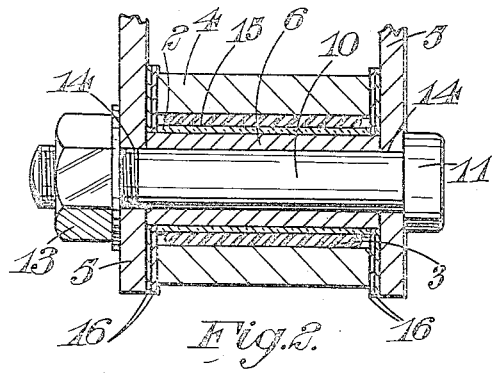
Figures 2 and 3 are similar views of modifications.
Figure 3:
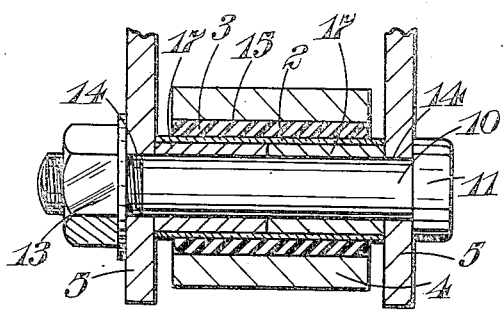

Where, as in the construction illustrated in Figure 1, the bush is applied to a spring hanger (shackle or dumb iron) having a pair of fixed jaws 5, 5, the inner bearing member conveniently takes the form of a tubular metal distance-piece 6 extending from jaw to jaw. To hold this distance-piece in position, when the jaws are connected by a rigid web 7, the hole 8 in one jaw of the hanger may be of a diameter equal to that of the distance-piece 6, and the hole 9 in the other jaw may be made smaller. A bolt 10 is passed through from jaw to jaw, its diameter being equal to that of the smaller hole 9. Near the head 11 of this bolt is a washer, or an integral part 12 of the bolt, of a diameter to fit the larger hole 8, and the parts are so dimensioned that, as the nut 13 on the bolt is tightened up, this enlargement 12 bears upon the end of the distance-piece 6 and clamps it against the jaw 5 having the smaller hole 9.

Where such a tubular distance-piece is used in conjunction with separate side links, or shackles which are sufficiently resilient, it may be clamped between the latter in the known manner, as shown in Figures 2–4, both holes 14 being of equal size. Conveniently, the shackles are formed by pressing from mild sheet steel, so that the webs connecting the jaws are able to yield slightly as the bolt 10 is tightened.

In Figure 1, a plain metal distance-piece 6 is used, this being inserted into the bush from one side only, so that the deformable rubber 3 is expanded into the spring eye 4, where it may be further secured by cementing at 15 to prevent relative slip.

In this case it will be seen that the rubber sleeve 3 does project slightly on each side of the eye, but sufficient clearance is provided between it and the jaws 5 to obviate any risk of squeaking due to contact between the jaws and the rubber. The liner 4 is usually considerably longer than the sleeve 3 and is arranged to bear against the jaws 5.

Where there is a possibility of the bush being subjected to tilting and heavy side forces, as is the case with certain kinds of spring shackles, annular shims 16 of thin hard metal, preferably stainless steel, may be arranged between the ends of the spring eyes 4 (or the equivalent) and the shackle jaws 5. Provided that at least two of such shims are employed at each point, their outer surfaces (or the outer shims) tend to adhere to the faces of the softer spring shackles and eyes, and consequently the shims rub on each other and afford lateral support which prevents tilting and overloading of the end parts of the rubber bushes. In this case, the deformable rubber sleeve, before compression, should be considerably narrower than the spring eye, to allow for slight spreading under load.

The feature of Figure 3 is that the metal distance-piece is divided transversely, or rather, that two short sleeves 17, 17 of equal length are used. It has been found that, by inserting these short sleeves into the bush from opposite ends, assembly is greatly facilitated and the risk of displacing the rubber sleeve 3 is reduced.

In Figure 4, two sleeves 18, 18 are shown in process of being inserted into the bush, each having a small flange 19 at its outer end. The sleeves are preferably tapered as shown, so that when they are in position the rubber sleeve 3 is under higher compression at the ends than at the centre, when the bore of the eye 4 is uniform. On the other hand, if the bore of the eye is greater at the ends than in the centre, as is often the case, the tapered sleeves 18, 18 effect a substantially uniform radial compression of the rubber sleeve 3 throughout its whole length.

Figure 5:
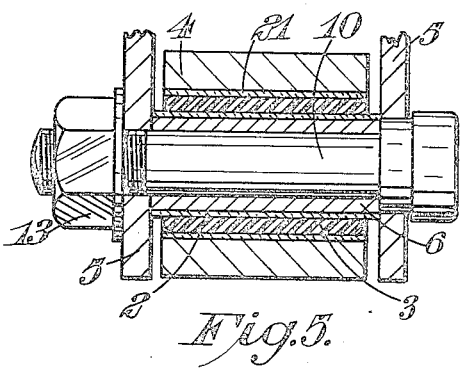
Figures 5 and 6 are axial sections of modified forms of bush bearings according to the invention.

The liner 2 to which the rubber sleeve is united may be arranged either inside the rubber sleeve as described above and shown in Figures 1 to 4, or outside it; or there may be a liner both inside and outside. This latter modification is illustrated in Figure 5, where 21 indicates the outer liner. In this case, when a large angular movement occurs, there may be a certain amount of slip between the inner liner 2 and the inner bearing member or between the outer liner 21 and the outer bearing member 4, or at both places.

Figure 6:
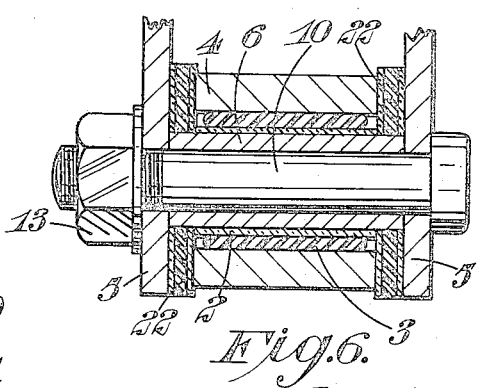

With reference to the modification of Figure 6, in some exceptional cases where heavy loads are imposed on relatively narrow springs, it may be advantageous to employ side washers 22, 22 of the composite rubber construction in place or the thin high tensile steel washers 16, 16 shown in Figure 2. Such composite side washers have a thickness of rubber approximately equal to that in the bush itself, and the rubber is reinforced and prevented from spreading under load by a facing of fabric or other suitable material on one or both faces, the latter being illustrated in Figure 6. It should be understood, however, that side washers or any washers are not usually necessary, the bush itself being quite able to take heavy side thrust, though naturally a clearance at each side is then necessary to enable side thrust to be taken without the spring eye 4 impacting the side links 5, 5.

Should lubrication of the bush become desirable, as, for instance, to facilitate the entry of the sleeves 6, 17 or 18, castor oil, or other vegetable oil, may be used.

In most cases the inner liner 2 would be a complete plain tube, but, if desirable, it could be slit lengthwise to facilitate the insertion of the oversize inner member and to allow the necessary radial compression of the rubber.

What I claim as my invention and desire to secure by Letters Patent of the United States is:—

1. In combination, a bearing housing, a bush bearing fitting therein and comprising a deformable rubber sleeve united with a liner of harder friction material, and an oversize sleeve within said bush bearing, said oversize sleeve forming an inner bearing member co-acting with said housing.

2. In combination, a bearing housing, a bush bearing fitting therein and comprising a deformable rubber sleeve united with a liner of harder material, an oversize sleeve within said bush bearing, said oversize sleeve forming an inner bearing member co-acting with said housing, said oversize sleeve being divided transversely and the parts thereof being externally tapered towards their inner ends.

3. A bush bearing, for inner and outer bearing members, comprising a deformable rubber sleeve, a liner of harder material united to the interior thereof, said liner consisting of woven fabric impregnated with a material to make it stiff and give it frictional characteristics, said bush bearing having a push fit with respect to said outer bearing member and of a radial thickness such that said inner bearing member is oversize with respect to the bore of said bush bearing.

4. In combination, a spring hanger having a pair of spaced jaws with aligned holes therein, a hollow bearing housing between said jaws, a coaxial bush bearing in said housing, said bush bearing being fitted therein and comprising a deformable rubber tube and an inner liner of a non-metallic distortable material having a high co-efficient of friction, a co-axial sleeve through said bush bearing and having an external diameter greater than the bore of said bush bearing when unstressed, and a co-axial bolt through said sleeve and the holes in said jaws, said bolt acting to firmly clamp said sleeve to said hanger.

5. In combination, a spring hanger having a pair of spaced jaws, aligned holes in said jaws, a hollow bearing housing between said jaws, a co-axial bush bearing in said housing, said bush bearing being a fit therein and comprising a deformable rubber tube and an inner liner of a non-metallic distortable material having a high co-efficient of friction, a co-axial sleeve through said bush bearing having an external diameter greater than the bore of said bush bearing when unstressed, a co-axial bolt through said sleeve and the holes in said jaws, said bolt acting to firmly clamp said sleeve to said hanger, one of said holes being a running fit on said bolt while the other has a bore not less than the external diameter of said sleeve, said bolt having an enlarged part which rests partly in said larger hole and bears against the adjacent end of said sleeve, whereby the latter is clamped by the bolt to the jaw having the smaller hole.

6. A bush bearing for inner and outer spaced bearing members, comprising a deformable rubber sleeve, and a stiff frictional liner united to the deformable sleeve to maintain the latter against spreading when subjected to radial pressure, said bush bearing adapted to be compressed between the inner and outer bearing members and said frictional liner adapted to slip on its adjacent bearing member upon deformation of the sleeve to a predetermined extent.

In testimony whereof I affix my signature.
HAMILTON NEIL WYLIE.